Oct. 10, 1961  T. A. RIBICH  3,003,224
CUTTING TOOL
Filed Feb. 6, 1958
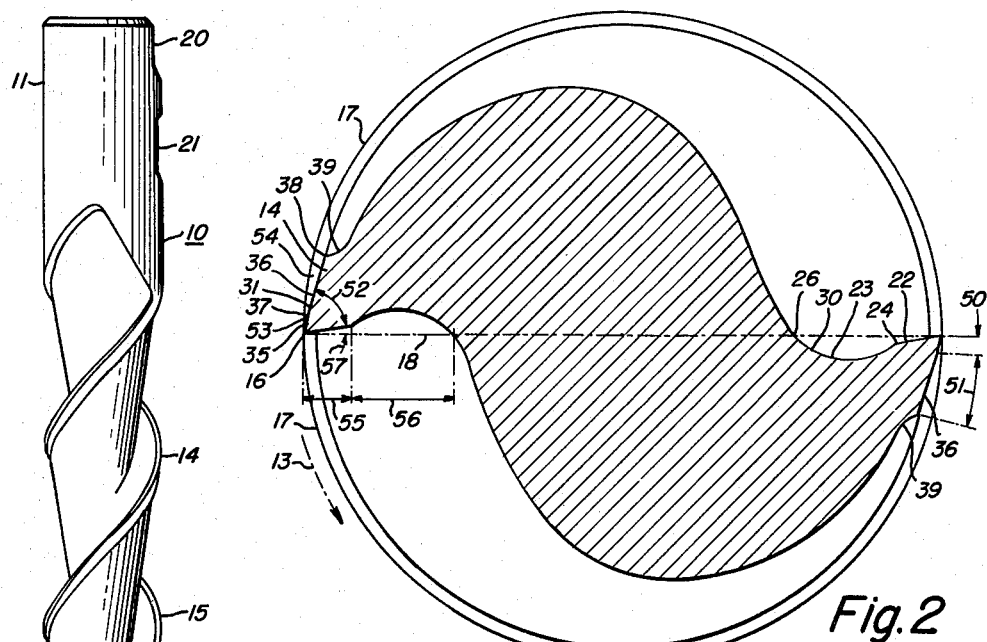
Fig. 1
Fig. 2
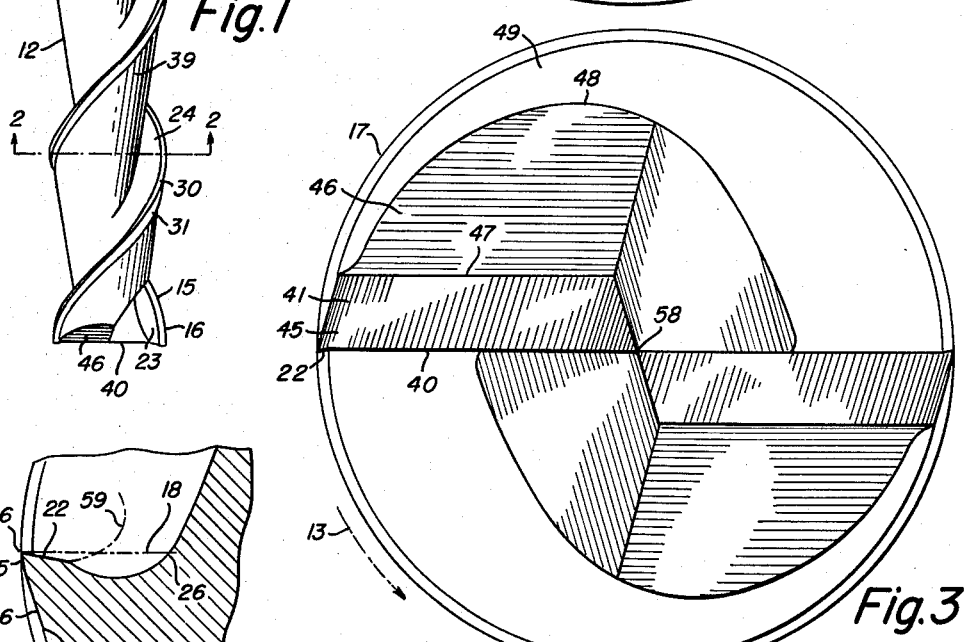
Fig. 3
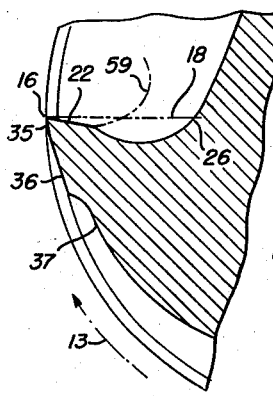
Fig. 4
INVENTOR.
THOMAS A. RIBICH
BY Hoodling and Krost
attys ial Patent Office 3,003,224
Patented Oct. 10, 1961

3,003,224
CUTTING TOOL
Thomas A. Ribich, Cleveland, Ohio, assignor to
The Weldon Tool Company
Filed Feb. 6, 1958, Ser. No. 713,584
2 Claims. (Cl. 29—103)

The invention relates generally to rotating milling cutters and more particularly to end mills and the like.

In this application the term "helical" is used to describe a cutting edge or flute which progresses uniformly or non-uniformly around a cylindrical, conical or other surface in an axial direction.

An object of the invention is a rotating milling cutter having a plurality of helical teeth extending toward the end of the cutter, the helical teeth each having a cutting edge.

Another object of the invention is a rotating milling cutter having helical cutting teeth comprising of a peripheral relief face surface having substantially a constant clearance angle with respect to the circumferential cutting path at all planes along the helical cutting teeth.

Another object of the invention is a rotating milling cutter having helical cutting teeth comprised of a cutting face wall having a primary tooth surface which reduces adherence of chips to the tooth surface.

Another object of the invention is the provision of a rotating milling cutter which cuts at a relatively high speed without over-heating the cutting edges.

Another object of the invention is the provision of a rotating milling cutter which cuts at a relatively high speed without causing the chips or severed mass to adhere to the primary tooth surface.

Another object of the invention is the provision of a rotating milling cutter which reduces horse power requirements.

Another object of the invention is the provision of a rotating milling cutter which reduces work stresses and inaccuracies due to heat generated by the tool.

Another object of the invention is the provision of a rotating milling cutter which reduces frequencies of sharpening of the cutting edge.

Another object of the invention is the provision of a rotating milling cutter which minimizes poor surface finish on the workpiece.

Another object of the invention is the provision of a rotating milling cutter which reduces to a minimum the stresses subjected to the machine tool.

Other objects and a fuller understanding of the invention may be had by referring to the following description and claims taken in conjunction with the accompanying drawing in which:

FIGURE 1 represents a side view of an end mill embodying the invention;

FIGURE 2 represents an enlarged cross-section of the end mill, taken along line 2—2 in FIGURE 1;

FIGURE 3 represents an enlarged end view of the cutting end of the end mill; and FIGURE 4 is a fragmentary view of a cutting tooth showing the reverse section of FIGURE 2, looking from the shank portion to the cutting end.

With reference to FIGURE 1 of the drawing, the invention is embodied in an end mill 10 comprising a shank portion 11 and a fluted portion 12. The end mill 10 is adapted to rotate about an axis in the direction indicated by the directional arrow 13. The shank portion 11 has flat surfaces 20 and 21 to facilitate the holding of the end mill 10 in a driving device. The fluted portion 12 has two helical cutting teeth 14 and 15 thereon, although any other number of teeth may be employed. The cutting teeth 14 and 15 are identical and each has a cutting edge 16 which constitutes a helical edge line.

FIGURE 2 is an enlarged cross-section taken along the line 2—2 shown in FIGURE 1 looking from the cutting end toward the shank portion. The helical cutting teeth 14 and 15 comprise a cutting face wall 30 and a peripheral relief face wall 31. The cutting face wall 30 and the perihperal relief face wall 31 converge toward each other and define an actute angle 52 therebetween to form the cutting edge line 16. The cutting edge line 16 rotates in a circumferential cutting path 17, and in a direction as shown by arrow 13. With further reference to FIGURE 2, the peripheral relief face wall 31 is comprised of a first back-off surface 35 and a second back-off surface 36. The first back-off surface 35 extends from the cutting edge line 16 to the first back-off line 37. The first back-off surface 35 has a substantially constant clearance angle 53 with respect to the circumferential cutting path 17. The second back-off surface 36 extends from the first back-off line 37 and terminates at a second back-off line 38. The second back-off surface 36 has a substantially constant clearance angle 54 with respect to the circumferential cutting path 17. The second back-off surface 36 defines a juncture with a backing side 39 at the second back-off line 38. The first back-off surface 35 and the second back-off surface 36 constitute flat surfaces and the first back-off surface 35 is preferably highly polished. The clearance angle 54 and the width 51 of the second back-off surface 36 is greater than the clearance angle 53 and the width 50 of the first back-off surface 35.

Still with reference to FIGURE 2, the cutting face wall 30 is comprised of a polished primary tooth surface 22 and a secondary tooth surface 23. The cutting face wall 30 defines a recess with a diameter line 18, and the cutting face wall 30 resides on the side of the diameter line 18 which is opposite to the direction of the rotation shown by the arrow 13. The polished primary tooth surface 22 constitutes a flat surface and defines an acute angle 57 with the diameter line 18. The primary tooth surface 22 extends from the cutting edge line 16 and terminates at a chip take-off line 24. The chip take-off line 24 is a helical line extending along the tooth and is identified as a point in the plane of the section of the line 2—2. The secondary tooth surface 23 constitutes an arcuate surface and extends from the chip take-off line 24 and terminates at an intersection 26 of the secondary tooth surface 23 and the diameter line 18. As will be noted from FIGURE 2 this surface continues from 26 to the peripheral relief wall of the opposite cutting tooth. A reference line is drawn through point 26 of tooth 14 which is perpendicular to the diameter line and it will be noted that surface 23 lies on one side thereof and the continuing surface lies on the other. The polished primary tooth surface 22 comprises a width identified by the reference character 55 and is preferably less than forty percent of the combined distance 56 and 55 between the cutting edge line 16 and the intersection 26. In the drawing, the width 55 is approximately thirty percent of the combined distance 56 and 55.

FIGURE 3 is an enlarged end view of the cutting end of the end mill 10 looking toward the shank portion 11. The cutting end portion consists of an end cutting edge 40 and an end relief face wall 41. The end relief face wall 41 consists of a first end back-off surface and a second end back-off surface 46. The first back-off surface 45 extends from the end cutting edge 40 and terminates at the first back-off line 47. The second end back-off surface 46 extends from the first back-off line 47 and terminates at the second back-off line 48 which defines a juncture with an end backing side 49. The end cutting edge 40 extends from the cutting edge line 16 and terminates at a center point 58 of the end mill 10.

In other rotating milling cutters, the chips tend to adhere to the entire cutting face wall, rendering the tool useless. The primary function of this end mill is to prevent the chips, especially aluminum or non-ferrous chips, from adhering to the cutting face wall. The operation of the end mill will be better understood by referring to FIGURE 4 of the drawing in which the line 59 indicates the path the chips will follow after being severed from the cutting material. As the rotation of the end mill 10 takes place, the helical cutting edge 16 engages the material being machined. As the cutting continues the severed chips, or shavings, are forced away from the secondary tooth surface 23 of the cutting face wall 30 by the polished primary tooth surface 22. In other end mills, the cutting face wall has but a single operating surface while, in this invention, the cutting face wall has two operating surfaces, namely, the polished primary tooth surface and the secondary tooth surface 23.

Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. An end mill comprising a fluted portion, said end mill adapted to rotate in a direction with said fluted portion rotating in a circumferential cutting path, said fluted portion having a plurality of helical cutting teeth each having a helical cutting edge, said helical cutting teeth each having a cutting face wall and a peripheral relief wall, said walls converging toward each other and defining an acute angle therebetween to form said helical cutting edge, said peripheral relief face wall comprising a first back-off surface and a second back-off surface, said first back-off surface extending from said helical cutting edge and terminating at a first back-off portion and having substantially a constant clearance angle with respect to the circumferential cutting path at all places along said helical cutting tooth, said second back-off surface extending from said first back-off portion and terminating at a second back-off portion and having substantially a constant clearance angle with respect to the circumferential cutting path at all places along said helical cutting tooth, said second back-off surface having a greater clearance angle and a greater width than that of said first back-off surface, said cutting face wall defining a recess with respect to a diameter line passing through the cutting edge and residing on a side of said diameter line which is opposite to said direction of rotation, said cutting face wall comprising a secondary tooth surface and a polished primary tooth surface, said polished primary tooth surface constituting a surface extending from said cutting edge and terminating at a helical chip take-off portion defining a juncture with said secondary tooth surface, said secondary tooth surface adjacent said juncture being recessed with respect to and lying out of the general plane in which said primary surface resides, said secondary tooth surface constituting an arcuate surface and extending from said chip take-off portion to an intersection with said diameter line, said arcuate surface of said secondary tooth surface including a continuing surface extending from said intersection with said diameter line to connect with said peripheral relief wall of another of said plurality of helical cutting teeth, said arcuate surface of said secondary tooth surface residing primarily on one side of a reference line drawn through said intersection of said arcuate surface and said diameter line and perpendicular to said diameter line and said continuing surface residing primarily on the other side of said reference line, said polished primary tooth surface having a width less than forty percent of the distance between said cutting edge and said intersection of said secondary tooth surface and said diameter line, and said polished primary tooth surface substantially defining an acute angle with the diameter line.

2. An end mill comprising a fluted portion, said end mill adapted to rotate in a direction with said fluted portion rotating in a circumferential cutting path, said fluted portion having a plurality of helical cutting teeth each having a helical cutting edge, said helical cutting teeth each having a cutting face wall and a peripheral relief wall, said walls converging toward each other and defining an acute angle therebetween to form said helical cutting edge, said cutting face wall defining a recess with respect to a diameter line passing through the cutting edge and residing on a side of said diameter line which is opposite to said direction of rotation, said cutting face wall comprising a secondary tooth surface and a primary tooth surface, said primary tooth surface constituting a surface extending from said cutting edge and terminating at a helical chip take-off portion defining a juncture with said secondary tooth surface, said secondary tooth surface adjacent said juncture being recessed with respect to said primary surface, said secondary tooth surface constituting an arcuate surface and extending from said chip take-off portion to an intersection with said diameter line, said arcuate surface of said secondary tooth surface including a continuing surface extending from said intersection with said diameter line to connect with said peripheral relief wall of another of said plurality of helical cutting teeth, said arcuate surface of said secondary tooth surface residing primarily on one side of a reference line drawn through said intersection of said arcuate surface and said diameter line and perpendicular to said diameter line and said continuing surface residing primarily on the other side of said reference line, said primary tooth surface having a width less than forty percent of the distance between said cutting edge and said intersection of said secondary tooth surface and said diameter line, and said primary tooth surface substantially defining an acute angle with the diameter line.

References Cited in the file of this patent

UNITED STATES PATENTS

| | | |
|---|---|---|
| 1,945,535 | Schiltz | Feb. 6, 1934 |
| 2,113,178 | Gase | Apr. 5, 1938 |
| 2,129,418 | Gase | Sept. 6, 1938 |
| 2,241,703 | Gommel | May 13, 1941 |
| 2,278,738 | Praeg | Apr. 7, 1942 |
| 2,297,611 | Drummond | Sept. 29, 1942 |
| 2,348,759 | Sneed | May 16, 1944 |
| 2,377,329 | Dittmer | June 5, 1945 |
| 2,411,209 | Hall | Nov. 16, 1946 |
| 2,677,170 | Kuns | May 4, 1954 |
| 2,778,924 | Hill | Jan. 22, 1957 |
| 2,889,669 | Babbitt | June 9, 1959 |

FOREIGN PATENTS

| | | |
|---|---|---|
| 520,060 | Belgium | June 15, 1953 |
| 534,331 | France | Jan. 4, 1922 |

OTHER REFERENCES

Weldon Tool Catalog No. 7A, copyrighted 1936 by the Weldon Tool Co., 321 Frankfort Ave., Cleveland, Ohio, pages 3, 4, and 10.